March 12, 1957     R. B. MacLEAN     2,784,684

PITCHER COVER AND CONFECTION FREEZING TRAY

Filed Feb. 24, 1954

INVENTOR

*Robert B. MacLean*

BY *Cameron, Kerkam & Sutton*

ATTORNEYS

United States Patent Office 2,784,684
Patented Mar. 12, 1957

2,784,684

PITCHER COVER AND CONFECTION FREEZING TRAY

Robert B. MacLean, Riverside, Ill., assignor to General Foods Corporation, New York, N. Y., a corporation of Delaware Application February 24, 1954, Serial No. 412,181

4 Claims. (Cl. 107—19)

This invention relates to pitcher covers and more particularly to such covers which can also be used as freezing trays for the freezing of stick-type confections of desired shape.

Heretofore various pitcher covers and confection freezing trays have been proposed but none are presently known which combine the functions of both and utilize the structures of each for the purposes of the other.

It is accordingly an object of the present invention to provide a novel pitcher cover and confection freezing tray in which the structure of one cooperates in the use of the other to provide at one and the same time a pitcher cover and a freezing tray for stick-type frozen confections in which the confections may be frozen in desired number and shape.

Another object is to provide such a pitcher cover and freezing tray which may be readily cast or formed as a unitary item from a plastic material or the like.

Another object is to provide such a pitcher cover and freezing tray which will be simple and cheap to manufacture, durable, and readily used in either of its capacities.

Another object is to provide such a cover and tray of pleasing appearance and of suitable resiliency to permit needed distortion when inserted in the top of a pitcher as a pitcher cover and when flexed to remove the frozen confection after utilization as a freeing tray.

Other and further objects of the present invention will appear from the following description thereof.

The pitcher cover and freezing tray of the present invention is capable of various mechanical embodiments, one of which is shown in the accompanying drawing and is described hereinafter for purposes of illustrating the same. This illustrative embodiment should in no way be construed as defining or limiting the invention and reference should be had to the appended claims to determine the scope thereof.

In the accompanying drawings, in which like reference characters indicate like parts, Fig. 1 is a view from above of one embodiment of the novel pitcher cover and freezing tray of the present invention showing the same utilized as a pitcher cover;

Figure 1:
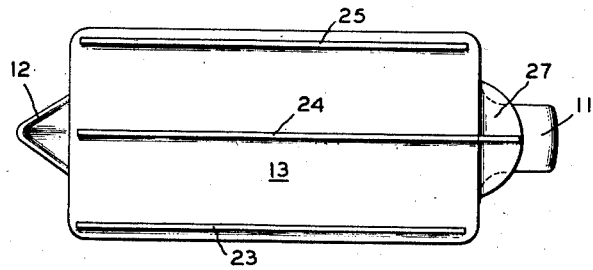
Figure 2:
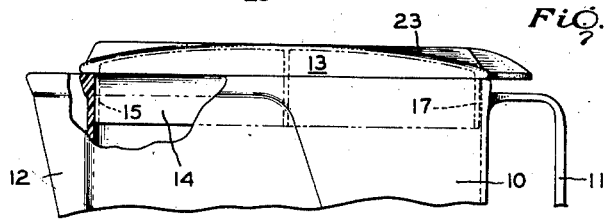
Fig. 2 is a side view of Fig. 1.
Figure 3:
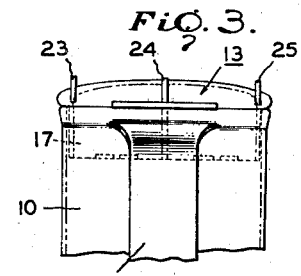
Fig. 3 is a view from the right of Fig. 1.
Figure 4:
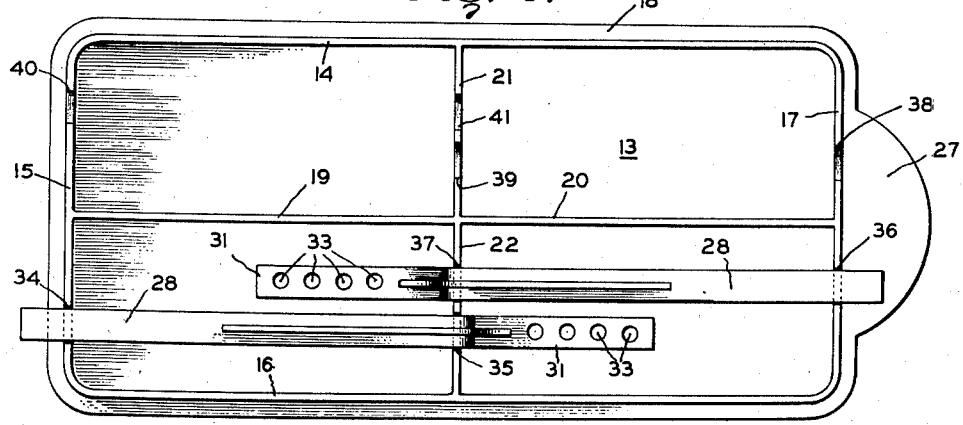
Fig. 4 is a view from above the pitcher cover of Fig. 1 reversed for use as a confection freezing tray showing a pair of confection sticks in place therein.

Referring now to the several figures, 10 is any suitable pitcher of any desired shape that is shown as generally rectangular in cross section with rounded corners. Pitcher 10 is provided with a suitable handle 11 and with a pouring spout 12. Pitcher 10, its handle 11 and pouring spout 12 may be formed as a unit from any suitable plastic or other material as desired.

Pitcher 10 is provided with a top generally indicated at 13. Top 13 may be made from the same material as pitcher 10 and preferably is formed as a unitary structure. Top 13 is of generally rectangular shape with rounded corners following the configuration of the cross section of pitcher 10 and is provided with upstanding side walls, 14, 15, 16, and 17, these walls being suitably joined at their corners by rounded extensions to form a continuous flange fitting the internal configuration of pitcher 10. Walls 14, 15, 16, and 17 are set back from the edge of top or base 13 to provide a margin 18 which extends completely around the exterior of the wall portions or flange of the top to form a surface for engaging the upper edge of the pitcher 10.

The area defined by walls 14, 15, 16, and 17 is divided into smaller areas, as desired, as by intersecting walls or partitions 19, 20, 21, and 22. By this arrangement four confection forming pockets of generally rectangular configuration are provided but it is to be expressly understood that as many of these pockets as may be desired may be formed in the top 13 by the use of suitably disposed walls.

Figure 5:
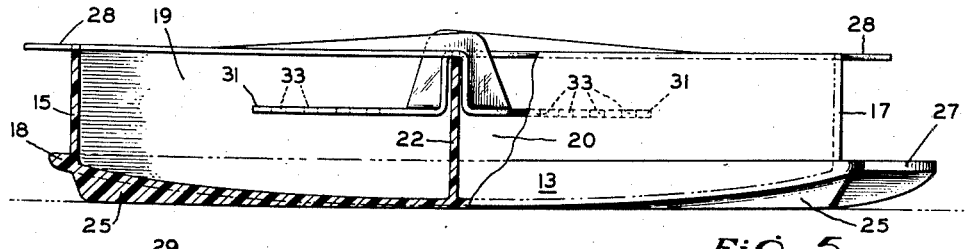
Fig. 5 is a side elevation, partly in section, of the cover of Fig. 1 in position for use as a confection freezing tray.

The exterior of top 13 may be given a pleasing appearance by rounding the same in directions parallel to and at right angles to the long axis of top 13, as seen in Fig. 5, with the further result that the bottoms of the pockets are dished somewhat. Moreover, when top 13 is rounded it is provided with runners 23, 24, and 25 the upper edges of which lie in the same plane. Thus when top 13 is utilized as a confection mold it will rest solidly upon a table or in a freezing compartment. Runners 23, 24, and 25 also serve the additional purpose of reducing the surface area of top 13 which would adhere to the supporting surface of a freezing compartment thus making it easier to remove top 13 when confections have been frozen therein.

Top 13 may be provided with an extension 27 for lifting or moving the same when in use as a confection mold. Extension 27 is arranged over handle 11 when top 13 is in place on pitcher 10 to provide a means for easy removal of top 13.

Figure 6:
Fig. 6 is a side view of a suitable confection stick as seen in Figs. 4 and 5.

In freezing certain types of confections it is desirable to provide a stick or similar member frozen into the confection so that the confection may be picked up for eating. A suitable stick for this purpose is shown at 28 in Fig. 6 and is preferably made as a unitary structure from plastic material. Stick 28 is provided with an extension 29 to be held in the hand, a right angled offset 30 and an extension 31 leading from offset 30, extension 31 being frozen into the confection. Offset 30 may be stiffened by a suitable web 32 and extension 31 is preferably apertured at 33 to assist in holding the stick 28 in the frozen confection.

One stick 28 is provided for each of the frozen confection forming pockets provided in top 13, as described above, and each such stick 28 should be held in position with respect to each such pocket during the freezing of the confection. To this end, walls 15 and 22 are provided with suitably aligned notches 34 and 35 to hold the stick 28 for the confection being frozen in the pocket defined by walls 20, 22, 16, and 17. Walls 17 and 22 are provided with suitably aligned notches 36 and 37, respectively, to hold the stick 28 for the confection to be frozen in the pocket defined by walls 15, 16, 19, and 22. Walls 17 and 21 are provided with suitably aligned notches 38 and 39 respectively to hold the stick for the confection to be frozen in the pocket defined by walls 14, 15, 19, and 21. Walls 15 and 21 are provided with notches 40 and 41 respectively to hold the stick for the confection to be frozen in the pocket defined by walls 14, 17, 20, and 21. Each stick 28 is therefore supported by two spaced supports against movement during freezing of the confection.

By making the top 13 and the several walls defining the confection freezing pockets of suitable plastic material the whole structure may be made sufficiently resilient to allow the ready removal of the frozen confections from the several pockets by distortion of top 13 and of the walls of the pockets. The resiliency of these walls also permits the ready insertion of the walls 14, 15, 16, and 17 into the top of pitcher 10 and allows ready removal of top 13 from pitcher 10.

It will now be seen that the present invention in every way satisfies the several objectives described above.

Changes in or modifications of the above described illustrative embodiment of this invention may now be suggested to those skilled in the art without departing from the present inventive concept and reference should therefore be had to the appended claims to determine the scope of this invention.

What is claimed is:

1. In a pitcher cover and confection freezing mold, a base having a peripheral edge, an upstanding continuous flange spaced inwardly from and adjacent to said edge and enclosing an area of said base, at least one partition crossing the said area and defining with said flange a plurality of confection molds, said flange and partition having aligned notches in their upper edges at opposite sides of a mold, and a confection stick extending across and supported in said aligned notches and having a confection-molding extension depending into an adjacent mold.

2. In a pitcher cover and confection freezing mold, a base having a peripheral edge, an upstanding continuous flange spaced inwardly from and adjacent to said edge and enclosing an area on said base, at least one partition crossing the said area and defining with said flange a plurality of confection molds, said flange and said partition each bearing in an upper edge one of a pair of aligned notches at opposite sides of each confection mold, and a confection stick extending across and supported in said aligned notches of one mold and having an offset confection-molding extension depending into an adjacent mold.

3. In a pitcher cover and confection freezing mold, a base having a peripheral edge, an upstanding continuous flange spaced inwardly from and adjacent to said edge and enclosing an area on said base, at least one partition terminating at each end in said flange, crossing the said area, and defining with said flange a plurality of confection molds, notches on the upper edge of said flange, notches on the upper edge of said partition each aligned with a notch on the upper edge of said flange at the opposite side of a mold, one pair of aligned notches corresponding to each confection mold, and a confection stick extending across and supported in the aligned notches of one mold and having an offset confection-molding extension depending into an adjacent mold.

4. A pitcher cover and confection freezing mold as defined in claim 3, the aligned notches of one mold being offset with respect to the aligned notches of an adjacent mold so that confection sticks may be supported simultaneously in both pairs of notches.

References Cited in the file of this patent
UNITED STATES PATENTS

| | | |
|---|---|---|
| 2,146,236 | Stamp | Feb. 7, 1939 |
| 2,151,282 | Stamp | Mar. 21, 1939 |
| 2,193,342 | Price | Mar. 12, 1940 |
| 2,583,355 | Bond | Jan. 22, 1952 |